United States Patent
Nomi et al.

(10) Patent No.: US 8,602,890 B2
(45) Date of Patent: Dec. 10, 2013

(54) GAME DEVICE, CONTROL METHOD FOR GAME DEVICE, PROGRAM, AND INFORMATION STORAGE MEDIUM

(75) Inventors: Mitsuhiro Nomi, Kanagawa (JP); Fumiaki Oshita, Tokyo (JP); Kazuto Nishimura, Tokyo (JP); Kazuhiko Ninomiya, Tokyo (JP); Takaharu Ikeda, Chiba (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 421 days.

(21) Appl. No.: 12/678,987

(22) PCT Filed: Aug. 11, 2008

(86) PCT No.: PCT/JP2008/064399
§ 371 (c)(1),
(2), (4) Date: Mar. 18, 2010

(87) PCT Pub. No.: WO2009/037929
PCT Pub. Date: Mar. 26, 2009

(65) Prior Publication Data
US 2010/0261528 A1    Oct. 14, 2010

(30) Foreign Application Priority Data
Sep. 19, 2007   (JP) .................................. 2007-242900

(51) Int. Cl.
*A63F 13/04* (2006.01)
(52) U.S. Cl.
USPC .................................... 463/33; 463/2; 463/37
(58) Field of Classification Search
USPC ........ 463/1, 2, 5, 36, 37, 38, 9, 30–34, 49, 53
See application file for complete search history.

(56) References Cited

U.S. PATENT DOCUMENTS

| 5,853,324 A | 12/1998 | Kami et al. |
| 6,672,962 B1 | 1/2004 | Ozaki et al. |

(Continued)

FOREIGN PATENT DOCUMENTS

| EP | 1147794 A2 | 10/2001 |
| JP | 10-290885 A | 11/1998 |

(Continued)

OTHER PUBLICATIONS

Operation Wolf video game play, Taito, 1987, http://www.arcade-museum.com/game_detail.php?game_id=8927.*
"Operation Wolf (part 1 of 2)", Operation Wolf video game play via YouTube video, http://www.youtube.com/watch?v=088y5VDQFzA.*
"Operation Wolf Arcade game", Operation Wolf video game play via YouTube video, http://www.youtube.com/watch?v=yTiQ_jHinN8.*

(Continued)

*Primary Examiner* — Damon Pierce
(74) *Attorney, Agent, or Firm* — Sughrue Mion, PLLC

(57) ABSTRACT

To provide a game device capable of improving reality regarding an operation of a game in which an attack on one or more attack targets is performed. Remaining number-of-times information storage means (70) stores remaining number-of-times information that indicates a remaining number of times an attack on one or more attack targets can be performed. Display means (74) displays a screen that includes a first image, containing a plurality of reference regions, and a second image. Image moving means (72) moves at least one of the first image and the second image according to a direction instructing operation of a player. Remaining number-of-times information update means (76) increases the remaining number of times the attack on one or more attack target can be performed based on a number of one or more reference regions included in a superposition region in which the first image and the second image are superposed on each other.

21 Claims, 12 Drawing Sheets

| AREA OF SUPERPOSITION REGION (a) | INCREASE NUMBER OF BULLETS |
|---|---|
| a < A1 | 0 |
| A1 ≤ a < A2 | 1 |
| A2 ≤ a < A3 | 2 |
| A3 ≤ a < A4 | 3 |
| A4 ≤ a < A5 | 4 |
| A5 ≤ a | 5 |

60 : VIRTUAL THREE-DIMENSIONAL SPACE

(56) References Cited

U.S. PATENT DOCUMENTS

2004/0009798 A1*  1/2004  Okuda et al. .................. 463/7
2005/0026684 A1   2/2005  Sumi et al.

FOREIGN PATENT DOCUMENTS

| | | |
|---|---|---|
| JP | 2000-037561 A | 2/2000 |
| JP | 2002-035420 A | 2/2002 |
| JP | 2005-137921 A | 6/2005 |
| WO | 99/58214 A | 11/1999 |

OTHER PUBLICATIONS

"Operation Wolf (part 1 of 2)", Operation Wolf video game play via YouTube video, http://www.youtube.com/watch?v=088y5VDQFzA, Aug. 24, 2007.*

"Operation Wolf Arcade game", Operation Wolf video game play via YouTube video, http://www.youtube.com/watch?v=yTiQ_jHinN8, Dec. 23, 2007.*

European Search Report corresponding to European Patent Application No. 08792382.7, dated Oct. 6, 2010.

Pal Wii Week: Wii Play UK Review, Dec. 5, 2006, XP002592044.

* cited by examiner

10 : MOBILE PHONE (a)

(b)

(c)

(d)

(a)

(b)

| CHAMBER ID | LOADED FLAG |
|---|---|
| 1 | 0 |
| 2 | 0 |
| 3 | 0 |
| 4 | 1 |
| 5 | 1 |

| AREA OF SUPERPOSITION REGION (a) | INCREASE NUMBER OF BULLETS |
|---|---|
| $a < A1$ | 0 |
| $A1 \leq a < A2$ | 1 |
| $A2 \leq a < A3$ | 2 |
| $A3 \leq a < A4$ | 3 |
| $A4 \leq a < A5$ | 4 |
| $A5 \leq a$ | 5 |

GAME DEVICE, CONTROL METHOD FOR GAME DEVICE, PROGRAM, AND INFORMATION STORAGE MEDIUM

TECHNICAL FIELD

The present invention relates to a game device, a control method for a game device, a program, and an information storage medium.

BACKGROUND ART

A game in which an attack on one or more attack targets is performed is known. For example, a gun shooting game for shooting an enemy character with a virtual pistol is known. In such a gun shooting game, a limitation is imposed on the number of bullets that can be loaded into the pistol in the same manner as a real pistol, and a player is required to perform a reloading (bullet-loading) operation. For example, an operation of depressing a predetermined button, an operation of vertically shaking a controller, or an operation of shooting an outside of a game screen is employed as the reloading operation.
Patent Citation 1: WO 99/58214

DISCLOSURE OF THE INVENTION

Problems to be Solved by the Invention

For example, even though actual reloading work is extremely burdensome work, a conventional gun shooting game employs a relatively simple operation as a reloading operation. As a result, the operation in the conventional gun shooting game lacks reality in some points. For example, even though a case where reloading must be performed with an approaching enemy kept in mind should create a considerable sense of tension, the conventional gun shooting game allows the reloading with a relatively simple operation, and therefore lacks a sense of tension.

The present invention has been made in view of the above-mentioned problem, and therefore an object thereof is to provide a game device, a control method for a game device, a program, and an information storage medium, in which it becomes possible to improve reality regarding an operation of a game in which an attack on one or more attack targets is performed.

Means for Solving the Problems

In order to solve the above-mentioned problem, a game device according to the present invention is a game device for executing a game in which an attack on one or more attack targets is performed, including: remaining number-of-times information storage means for storing remaining number-of-times information that indicates a remaining number of times an attack on one or more attack targets can be performed; display means for displaying a screen that includes a first image, containing a plurality of reference regions, and a second image; image moving means for moving at least one of the first image and the second image according to a direction instructing operation of a player; and remaining number-of-times information update means for increasing the remaining number of times based on a number of one or more reference regions included in a superposition region in which the first image and the second image are superposed on each other.

Further, a control method for a game device according to the present invention is a control method for a game device for executing a game in which an attack on one or more attack targets is performed, the control method including: a step of reading storage contents of remaining number-of-times information storage means for storing remaining number-of-times information that indicates a remaining number of times an attack on one or more attack targets can be performed; a step of displaying, on display means, a screen that includes a first image, containing a plurality of reference regions, and a second image; an image moving step of moving at least one of the first image and the second image according to a direction instructing operation of a player; and a remaining number-of-times information update step of increasing the remaining number of times based on a number of one or more reference regions included in a superposition region in which the first image and the second image are superposed on each other.

Further, a program according to the present invention is a program for causing a computer, such as a mobile phone, a stationary game machine (consumer game machine), a portable game machine, an arcade game machine, a personal digital assistant (PDA), or a personal computer, to function as a game device for executing a game in which an attack on one or more attack targets is performed, the program further causing the computer to function as: means for reading storage contents of remaining number-of-times information storage means for storing remaining number-of-times information that indicates a remaining number of times an attack on one or more attack targets can be performed; means for displaying, on display means, a screen that includes a first image, containing a plurality of reference regions, and a second image; image moving means for moving at least one of the first image and the second image according to a direction instructing operation of a player; and remaining number-of-times information update means for increasing the remaining number of times based on a number of one or more reference regions included in a superposition region in which the first image and the second image are superposed on each other.

Further, an information storage medium according to the present invention is a computer-readable information storage medium storing the above-mentioned program.

The present invention relates to the game device for executing the game in which an attack on one or more attack targets is performed. In the present invention, the remaining number-of-times information indicating the remaining number of times an attack on one or more attack targets can be performed is stored. Also in the present invention, the screen that includes the first image, containing the plurality of reference regions, and the second image, is displayed. The at least one of the first image and the second image is moved according to the direction instructing operation of the player. The remaining number of times the attack on one or more attack targets can be performed is increased based on the number of one or more reference regions included in the superposition region in which the first image and the second image are superposed on each other. According to the present invention, it becomes possible to improve the reality regarding the operation of the game in which an attack on one or more attack targets is performed.

Further, according to an aspect of the present invention, the remaining number-of-times information storage means may store attack enabled/disabled information, which indicates whether or not the attack on one or more attack targets can be performed, in association with each of the plurality of reference regions, the game device may further include means for updating, in a case where the attack on one or more attack targets is performed, the attack enabled/disabled information associated with any one of the plurality of reference regions associated with the attack enabled/disabled information indicating that the attack on one or more attack targets can be performed, so as to indicate that the attack on one or more attack targets cannot be performed, and in a case where the attack enabled/disabled information, which is associated with a reference regions included in the superposition region in which the first image and the second image are superposed on each other, indicates that the attack on one or more attack targets cannot be performed, the remaining number-of-times information update means may update the attack enabled/disabled information so as to indicate that the attack on one or more attack targets can be performed.

Further, according to another aspect of the present invention, the image moving means may move the second image according to the direction instructing operation of the player, and the game device may further include means for changing a size of the second image based on the remaining number of times.

Further, according to a further aspect of the present invention, the image moving means may move one of the first image and the second image according to the direction instructing operation of the player, and may change a position of the other of the first image and the second image based on a distance between an attack target and one of a player character and a viewpoint.

Further, according to a still further aspect of the present invention, the image moving means may move one of the first image and the second image according to the direction instructing operation of the player, and may change a position of the other of the first image and the second image based on a number of one or more attack targets positioned inside a predetermined region based on a position of a player character or a viewpoint.

Further, according to a yet further aspect of the present invention, the image moving means may move one of the first image and the second image according to the direction instructing operation of the player, and may change a position of the other of the first image and the second image based on a value of a condition parameter that indicates a condition of a player character.

Further, according to a yet further aspect of the present invention, the image moving means may move one of the first image and the second image according to the direction instructing operation of the player, and may change a position of the other of the first image and the second image based on a degree of progress of the game.

Further, a game device according to the present invention is a game device for executing a game in which an attack on one or more attack targets is performed, including: remaining number-of-times information storage means for storing remaining number-of-times information that indicates a remaining number of times an attack on one or more attack targets can be performed; display means for displaying a game screen that includes a first image, containing a plurality of reference regions, and a second image; image moving means for moving at least one of the first image and the second image according to a direction instructing operation of a player; increase number information storage means for storing increase number information that associates an area with an increase number of the remaining number of times; acquisition means for acquiring the increase number corresponding to the area of a superposition region in which the first image and the second image are superposed on each other based on the increase number information; and remaining number-of-times information update means for increasing the remaining number of times based on the increase number acquired by the acquisition means.

Further, a control method according to the present invention is a control method for a game device for executing a game in which an attack on one or more attack targets is performed, the control method including: a step of reading storage contents of remaining number-of-times information storage means for storing remaining number-of-times information that indicates a remaining number of times an attack on one or more attack targets can be performed; a step of displaying, on display means, a game screen that includes a first image, containing a plurality of reference regions, and a second image; an image moving step of moving at least one of the first image and the second image according to a direction instructing operation of a player; a step of reading storage contents of increase number information storage means for storing increase number information that associates an area with an increase number of the remaining number of times; an acquisition step of acquiring the increase number corresponding to the area of a superposition region in which the first image and the second image are superposed on each other based on the increase number information; and a remaining number-of-times information update step of increasing the remaining number of times based on the increase number acquired in the acquisition step.

Further, a program according to the present invention is a program for causing a computer, such as a mobile phone, a stationary game machine (consumer game machine), a portable game machine, an arcade game machine, a personal digital assistant (PDA), or a personal computer, to function as a game device for executing a game in which an attack on one or more attack targets is performed, the program further causing the computer to function as: means for reading storage contents of remaining number-of-times information storage means for storing remaining number-of-times information that indicates a remaining number of times an attack on one or more attack targets can be performed; means for displaying, on display means, a game screen that includes a first image, containing a plurality of reference regions, and a second image; image moving means for moving at least one of the first image and the second image according to a direction instructing operation of a player; means for reading storage contents of increase number information storage means for storing increase number information that associates an area with an increase number of the remaining number of times; acquisition means for acquiring the increase number corresponding to the area of a superposition region in which the first image and the second image are superposed on each other based on the increase number information; and remaining number-of-times information update means for increasing the remaining number of times based on the increase number acquired by the acquisition means.

Further, an information storage medium according to the present invention is a computer-readable information storage medium storing the above-mentioned program.

The present invention relates to the game device for executing the game in which an attack on one or more attack targets is performed. In the present invention, the remaining number-of-times information indicating the remaining number of times an attack on one or more attack targets can be performed is stored. Also in the present invention, the game screen that includes the first image, containing the plurality of reference regions, and the second image, is displayed. The at least one of the first image and the second image is moved according to the direction instructing operation of the player. Further, in the present invention, the increase number information that associates the area with the increase number of the remaining number of times is stored. In addition, the increase number corresponding to the area of the superposition region in which the first image and the second image are superposed on each other is acquired based on the increase number information. The remaining number of times the attack on one or more attack targets can be performed is increased based on the acquired increase number. According to the present invention, it becomes possible to improve the reality regarding the operation of the game in which an attack on one or more attack targets is performed.

BEST MODE FOR CARRYING OUT THE INVENTION

Hereinafter, detailed description is given of an example of an embodiment of the present invention with reference to the drawings. Here, the description is given about an example in which a game device according to the present invention is implemented by using a mobile phone. Note that the game device according to the present invention can be implemented by a stationary game machine (consumer game machine), a portable game machine, an arcade game machine, a personal digital assistant (PDA), a personal computer, or the like.

Figure 1:
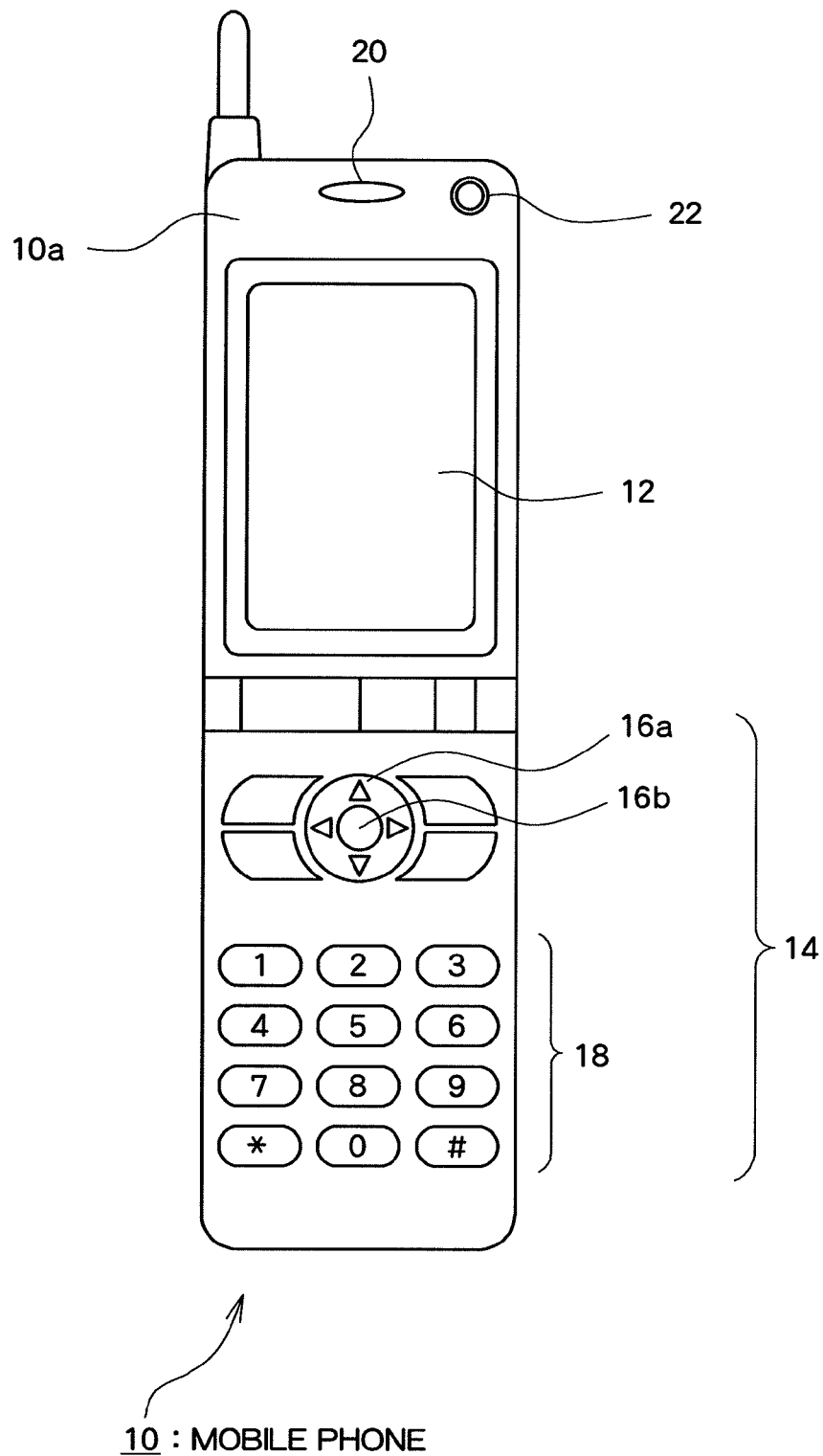
FIG. 1 is a diagram illustrating an external appearance of a mobile phone according to an embodiment of the present invention.
Figure 2:
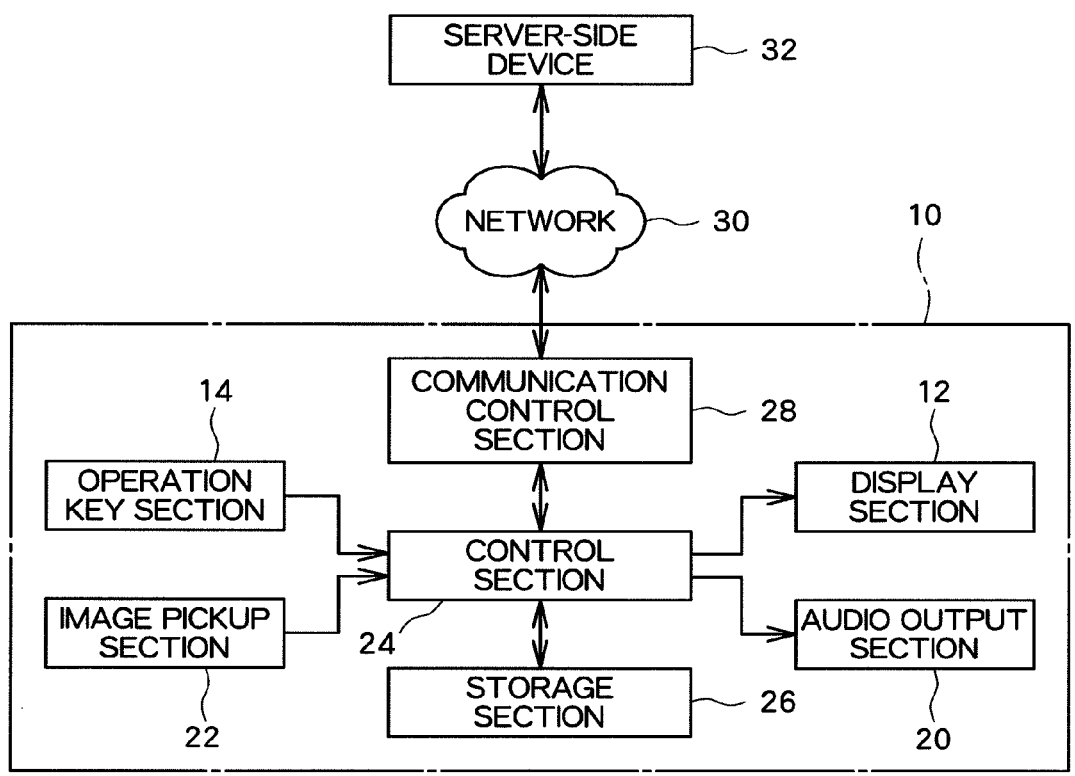
FIG. 2 is a diagram illustrating a hardware configuration of the mobile phone according to the embodiment.

FIG. 1 illustrates an example of an external appearance of a mobile phone 10 (game device) according to the embodiment. FIG. 2 illustrates a hardware configuration of the mobile phone 10. As illustrated in FIGS. 1 and 2, the mobile phone 10 includes a display section 12, an operation key section 14, an audio output section 20, an image pickup section 22, a control section 24, a storage section 26, and a communication control section 28.

The control section 24 controls each of the sections of the mobile phone 10 according to a program stored in the storage section 26. The control section 24 performs ordinary processing for a mobile phone (processing for an outgoing call and an incoming call and processing regarding a conversation), but hereinbelow, the description is mainly directed to processing related to the present invention. Specific contents of the processing executed by the control section 24 are described later.

The storage section 26 includes a main memory and a nonvolatile memory. The nonvolatile memory stores a program executed by the control section 24. This program is, for example, stored in the nonvolatile memory after being downloaded from a server-side device 32 via a network 30. Alternatively, the program is, for example, stored in the nonvolatile memory after being copied from a computer-readable information storage medium such as a memory card. A program read from the nonvolatile memory and various kinds of data necessary for the processing performed by the control section 24 are written to the main memory as necessary.

The communication control section 28 makes an outgoing call to a counterpart via a mobile phone network according to an instruction to make an outgoing call which is input from the control section 24. In addition, if a reception request arrives via the mobile phone network, the communication control section 28 transmits the reception request to the control section 24. Further, if there is an instruction for an incoming call from the control section 24, the communication control section 28 performs the processing for an incoming call in response to a reception request. Upon reception of an instruction to transmit data to the server-side device 32 (see FIG. 2) from the control section 24, the communication control section 28 transmits the data regarding the instruction via the network 30 (see FIG. 2). Further, the communication control section 28 receives the data that has arrived via the network 30 and outputs the data to the control section 24.

The display section 12 includes, for example, a liquid crystal panel. The display section 12 displays each kind of screen according to an instruction input from the control section 24. The audio output section 20 outputs each kind of audio (for example, ring tone, game music, and sound effects) according to an instruction input from the control section 24.

The operation key section 14 includes a direction instructing key 16a used for a direction instructing operation, an input deciding key 16b, and a key group 18 including ten numeric keys (ten keys) corresponding to the respective numerals "0" to "9".

The image pickup section 22 includes, for example, a known digital camera, and supplies the control section 24 with a taken image in black-and-white, gray scale, or color every predetermined cycle (for example, $\frac{1}{60}^{th}$ of a second). In this embodiment, the image pickup section 22 is used for taking an image of a figure of the player. That is, in this embodiment, an image of the player acquired every predetermined cycle is supplied to the control section 24 in real time.

Note that a known program for judging a posture (inclination or the like) of the mobile phone 10 based on the taken image from the image pickup section 22 is installed in the storage section 26 (nonvolatile memory). This program, which uses technology for a general optical flow, for example, acquires a difference between the latest image input from the image pickup section 22 and the preceding image every predetermined cycle (for example, $\frac{1}{30}^{th}$ of a second), and judges the posture of the mobile phone 10 based on the difference. By the installation of this program, the mobile phone 10 allows the player to perform an operation input by tilting the mobile phone 10.

On the mobile phone 10 having the above-mentioned structure and configuration, for example, a game for exterminating an enemy character (attack target) by using a virtual revolver-type pistol is executed. This game is realized by the control section 24 executing a game program stored in the storage section 26.

Figure 3:
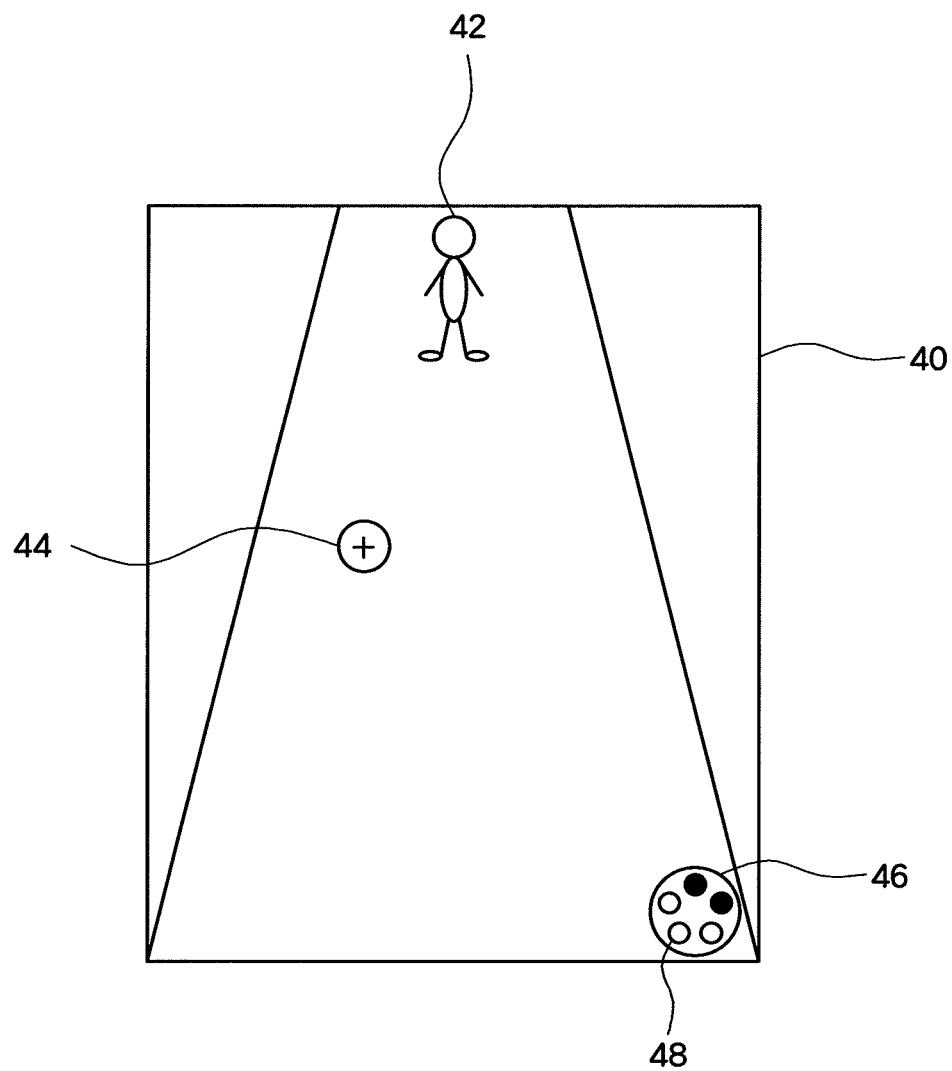
FIG. 3 is a diagram illustrating an example of a game screen.

FIG. 3 illustrates an example of a game screen displayed by the display section 12. A game screen 40 illustrated in FIG. 3 is a screen from a so-called first-person viewpoint, and a picture obtained by viewing the game space from a player character (player) is displayed on the game screen 40. An enemy character 42, a gunsight cursor 44, and a remaining number-of-bullets informing image 46 are displayed on the game screen 40 illustrated in FIG. 3.

The enemy character 42 comes moving toward the player character (player). When the player character is touched by the enemy character 42, the value of a stamina parameter of the player character is reduced. When the value of the stamina parameter of the player character becomes 0, the game is over. Thus, the player exterminates the enemy character 42 by shooting the enemy character 42 so as not to be approached by the enemy character 42. Note that the game may be over immediately when the player character is touched by the enemy character 42.

Figure 4:
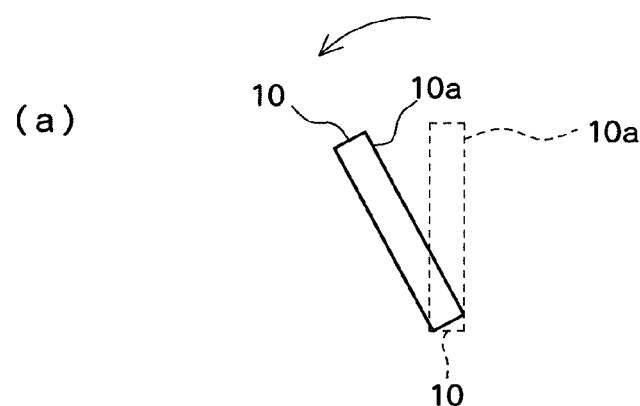
FIG. 4 is diagrams for description of a moving direction instructing operation for a gunsight cursor.
Figure 4:
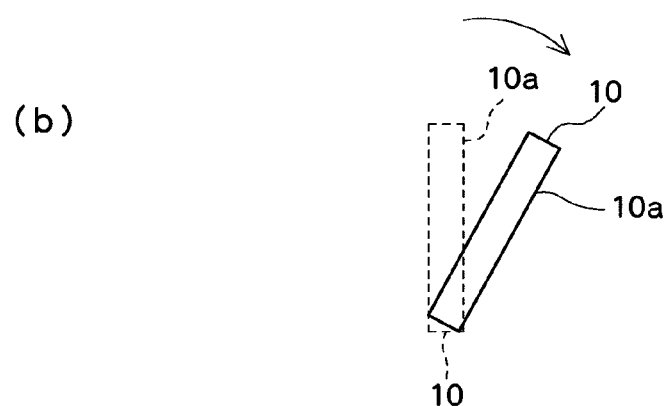
Figure 4:
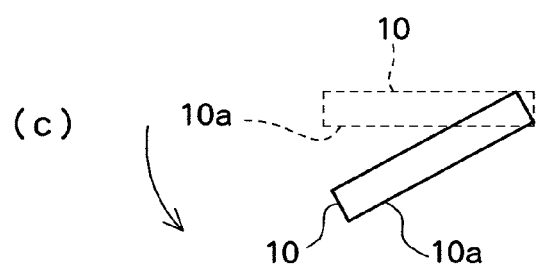
Figure 4:
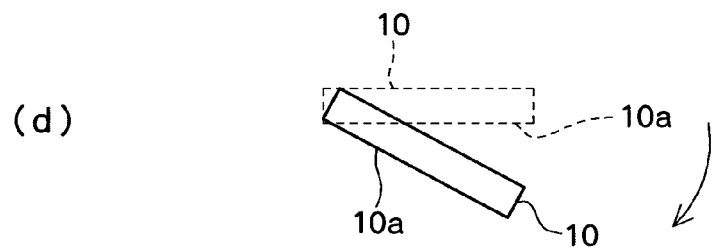

The gunsight cursor 44 moves according to a direction instructing operation of the player. In this embodiment, the player instructs a moving direction of the gunsight cursor 44 by tilting the mobile phone 10. FIG. 4 are diagrams for description about instruction of a moving direction of the gunsight cursor 44. Note that in FIG. 4, reference symbol 10a denotes a surface provided with the display section 12, the operation key section 14, the audio output section 20, and the image pickup section 22 of the mobile phone 10 (see FIG. 1). Further, FIGS. 4(a) and 4(b) illustrate a state in which the mobile phone 10 is viewed from a left side thereof. FIGS. 4(c) and 4(d) illustrate a state in which the mobile phone 10 is viewed from a top side thereof. As illustrated in FIG. 4(a), when the player tilts the mobile phone 10 in a depth direction, the gunsight cursor 44 moves upward on the game screen 40. As illustrated in FIG. 4(b), when the player tilts the mobile phone 10 in a frontward direction, the gunsight cursor 44 moves downward on the game screen 40. As illustrated in FIG. 4(c), when the player pulls the left side of the mobile phone 10 in the frontward direction, the gunsight cursor 44 moves leftward on the game screen 40. As illustrated in FIG. 4(d), when the player pulls a right side of the mobile phone 10 in the frontward direction, the gunsight cursor 44 moves rightward on the game screen 40.

When the player depresses a discharge instructing key (for example, input deciding key 16b), a bullet is discharged toward the gunsight cursor 44. When the player depresses the discharge instructing key with the gunsight cursor 44 focused on the enemy character 42, the bullet successfully hits the enemy character 42 to exterminate the enemy character 42.

Figure 5:
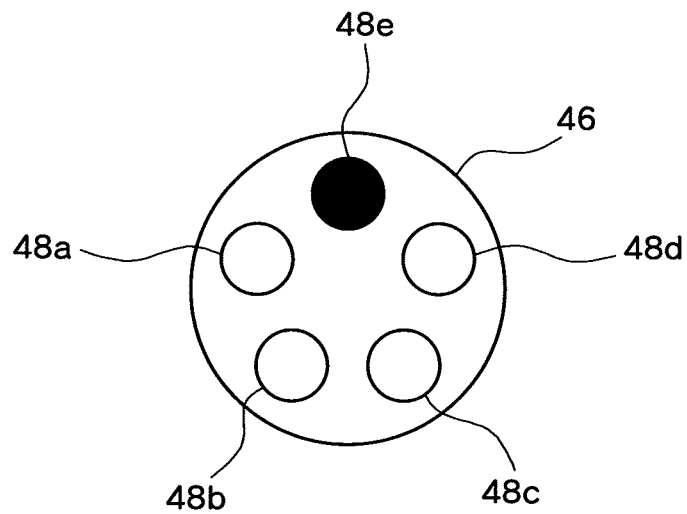
FIG. 5 is diagrams for description of a change of a remaining number-of-bullets informing image.
Figure 5:
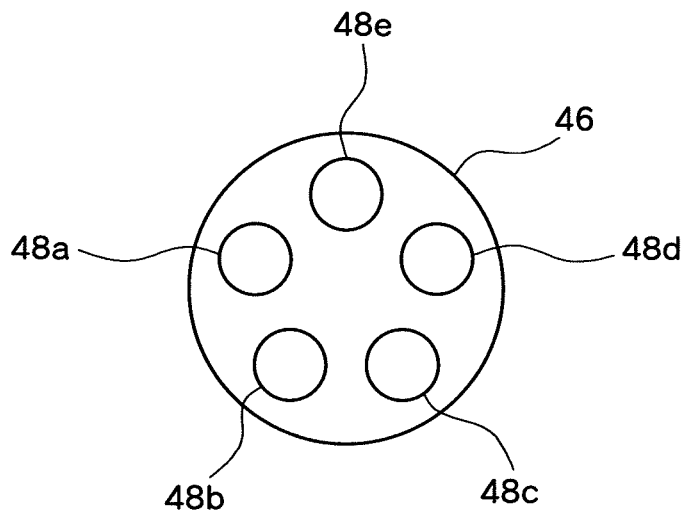

In this game, the number of bullets that can be loaded into the pistol is limited to 5. The remaining number-of-bullets informing image 46 indicates the number of bullets remaining inside the pistol (remaining number of bullets). That is, the remaining number-of-bullets informing image 46 indicates the remaining number of bullets that can be discharged. The remaining number-of-bullets informing image 46 is an image that imitates a cylinder of the revolver-type pistol having five chambers, and includes five chamber regions 48. The black chamber region 48 indicates that a bullet is loaded therein, while the white chamber region 48 indicates that a bullet is not loaded therein. Therefore, the number of the black chamber regions 48 indicates the remaining number of bullets, and the remaining number-of-bullets informing image 46 illustrated in FIG. 3 indicates that there are two bullets remaining. The remaining number-of-bullets informing image 46 changes every time a bullet is discharged. FIG. 5 are diagrams for description of a change of the remaining number-of-bullets informing image 46. When one bullet is discharged in the state illustrated in FIG. 3, any one of black chamber region 48d and black chamber region 48e turns white (FIG. 5(a)). When one more bullet is discharged in that state, the black chamber region 48e turns white, and all of the chamber regions 48a to 48e turn white (FIG. 5(b)). The remaining number-of-bullets informing image 46 in this case indicates that the remaining number of bullets is 0.

If the remaining number of bullets becomes 0, the player needs to execute reloading (reloading of bullets). On the mobile phone 10, improvement in reality regarding the above-mentioned reloading is realized, which causes the player to suitably feel that reloading work is burdensome and a sense of tension created when the reloading is performed under a situation in which the enemy character 42 is approaching. Hereinafter, this point is described in detail.

Figure 6:
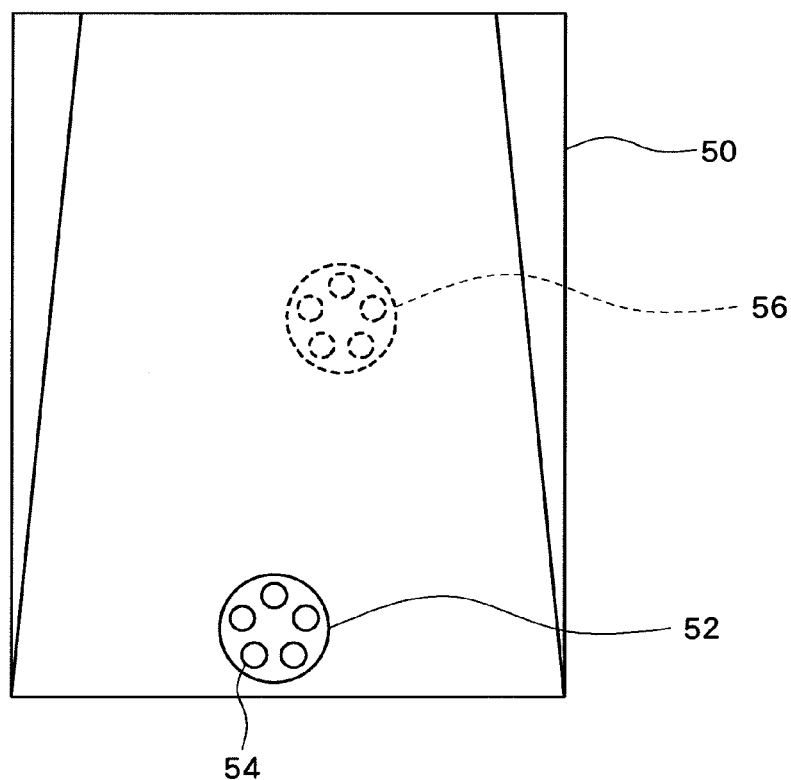
FIG. 6 is a diagram illustrating an example of a reloading screen.

In this embodiment, when the player depresses a reloading requesting key (for example, numeric key "1"), or when the player depresses the discharge instructing key in the state in which the remaining number of bullets is 0, a game screen for performing the reloading (hereinafter, referred to as "reloading screen") is displayed. FIG. 6 illustrates an example of the reloading screen. As illustrated in FIG. 6, a first cylinder 52 and a second cylinder 56 are displayed on a reloading screen 50. Similarly to the remaining number-of-bullets informing image 46, the first cylinder 52 and the second cylinder 56 are each an image that imitates the cylinder of the revolver-type pistol having five chambers. The first cylinder 52 and the second cylinder 56 have the same size. The first cylinder 52 includes five chamber regions 54. A current state of the remaining bullets (current state of the loaded bullets) is reflected upon the first cylinder 52. That is, similarly to the chamber region 48 of the remaining number-of-bullets informing image 46, the chamber region 54 of the chamber loaded with a bullet turns black, while the chamber region 54 of the chamber not loaded with a bullet turns white. The first cylinder 52 is fixed to a predetermined position on the reloading screen 50. Meanwhile, the second cylinder 56 moves according to the direction instructing operation of the player. In the same manner as the case of instructing the moving direction of the gunsight cursor 44, the player instructs the moving direction of the second cylinder 56 by tilting the mobile phone 10.

Figure 7:
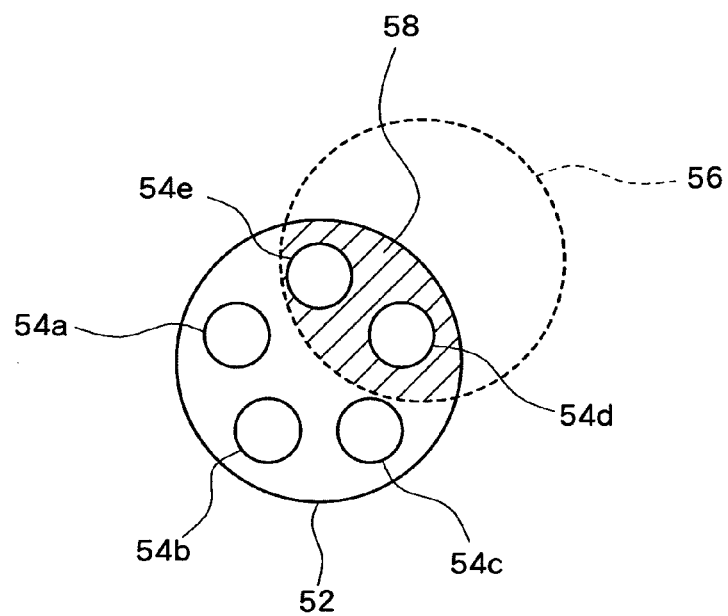
FIG. 7 is a diagram for description of bullet loading.
Figure 8:
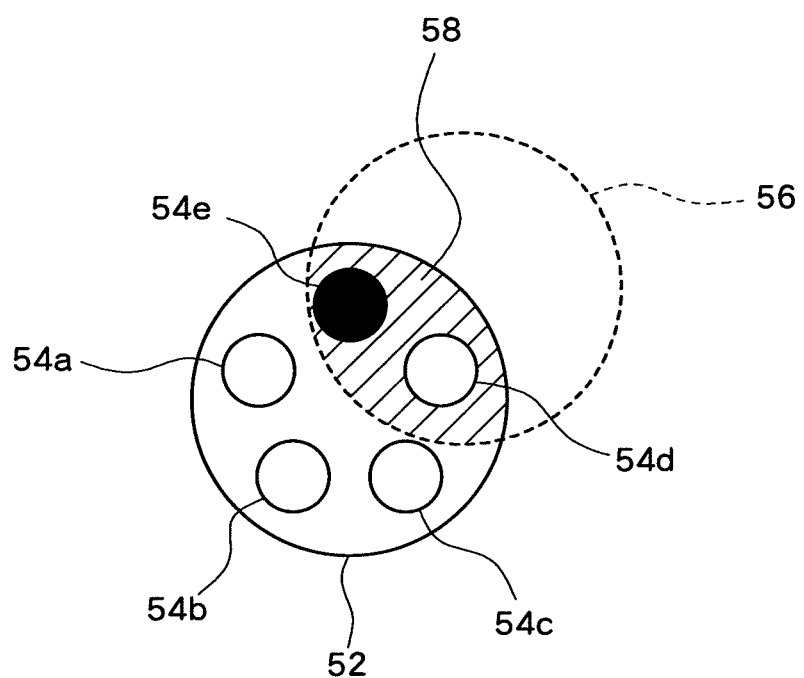
FIG. 8 is a diagram for description of the bullet loading.

The player adjusts the position of the second cylinder 56 so that the second cylinder 56 is superposed on the first cylinder 52. When the player depresses the reloading executing key (for example, input deciding key 16b), the chamber related to the chamber region 54 included in a superposition region in which the first cylinder 52 and the second cylinder 56 are superposed on each other at that point in time is loaded with a bullet. FIGS. 7 and 8 are diagrams for description of bullet loading. In the case illustrated in FIG. 7, two chamber regions 54d and 54e are included in a superposition region 58 in which the first cylinder 52 and the second cylinder 56 are superposed on each other, and hence the chambers related to those chamber regions 54d and 54e are each loaded with a bullet. That is, in this case, the remaining number of bullets increases by 2. Note that in the case illustrated in FIG. 8, the two chamber regions 54d and 54e are included in the superposition region 58 in which the first cylinder 52 and the second cylinder 56 are superposed on each other, but a bullet remains in the chamber region 54e. In this case, the chamber related to the chamber region 54e is not loaded with a bullet, and only the chamber related to the chamber region 54d is loaded with a bullet, and so the remaining number of bullets increases by 1. Note that a chamber region 54a corresponds to the chamber region 48a of the remaining number-of-bullets informing image 46. In the same manner, the chamber regions

54*b*, 54*c*, 54*d*, and 54*e* correspond to the chamber regions 48*b*, 48*c*, 48*d*, and 48*e* of the remaining number-of-bullets informing image 46, respectively.

Note that the enemy character 42 keeps moving toward the player character (player) even while the reloading screen 50 is on display. Therefore, the player character may be touched by the enemy character 42 during the reloading work. Therefore, the player needs to complete the reloading work as fast as possible.

Figure 9:
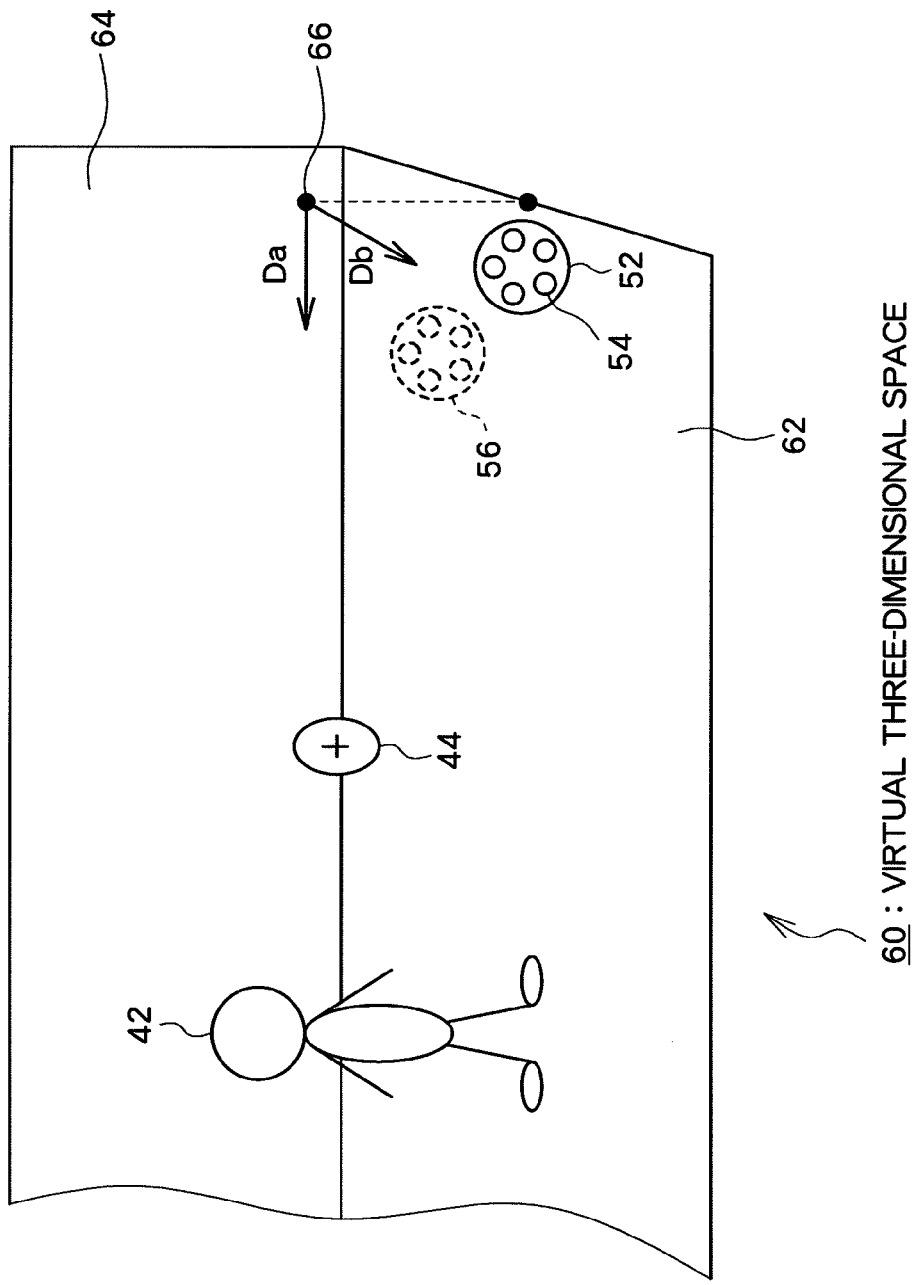
FIG. 9 is a diagram illustrating an example of a virtual three-dimensional space.

In order to display the game screen 40 illustrated in FIG. 3 and the reloading screen 50 illustrated in FIG. 6, a virtual three-dimensional space is built in the storage section 26 (main memory). FIG. 9 illustrates an example of the virtual three-dimensional space. As illustrated in FIG. 9, a floor object 62, a wall object 64, the enemy character 42 (enemy character object), the gunsight cursor 44 (gunsight cursor object), the first cylinder 52 (first cylinder object), and the second cylinder 56 (second cylinder object) are located in a virtual three-dimensional space 60. Also, a viewpoint 66 is located in the virtual three-dimensional space 60. The viewpoint 66 is located at a position at a fixed height from the floor object 62 (for example, at a position corresponding to a midpoint between a right eye and a left eye of the player character). The first cylinder 52 and the second cylinder 56 are located below the viewpoint 66 (for example, at a position corresponding to around a waist of the player character or around legs thereof), and move according to the viewpoint 66. A positional relationship between the first cylinder 52 and the viewpoint 66 is always constant. Positions and the like of the respective objects located in the virtual three-dimensional space 60 are stored in the storage section 26 (main memory).

An image indicating a state of the virtual three-dimensional space 60 when viewed from the viewpoint 66 in a viewing direction is generated, and the image is displayed on the display section 12 as the game screen 40 or the reloading screen 50. Normally, the viewing direction is set to a direction Da (frontward direction). As a result, the game screen 40 as illustrated in FIG. 3 is displayed. Meanwhile, in the case where the reloading is performed, the viewing direction is set to a direction Db (diagonally downward direction). As a result, the reloading screen 50 as illustrated in FIG. 6 is displayed. Note that the first cylinder 52 and the second cylinder 56 are located so as to be included in a field-of-view range if the viewing direction is set to the direction Db, and so as not to be included in the field-of-view range if the viewing direction is set to the direction Da.

Figures 10, 11:
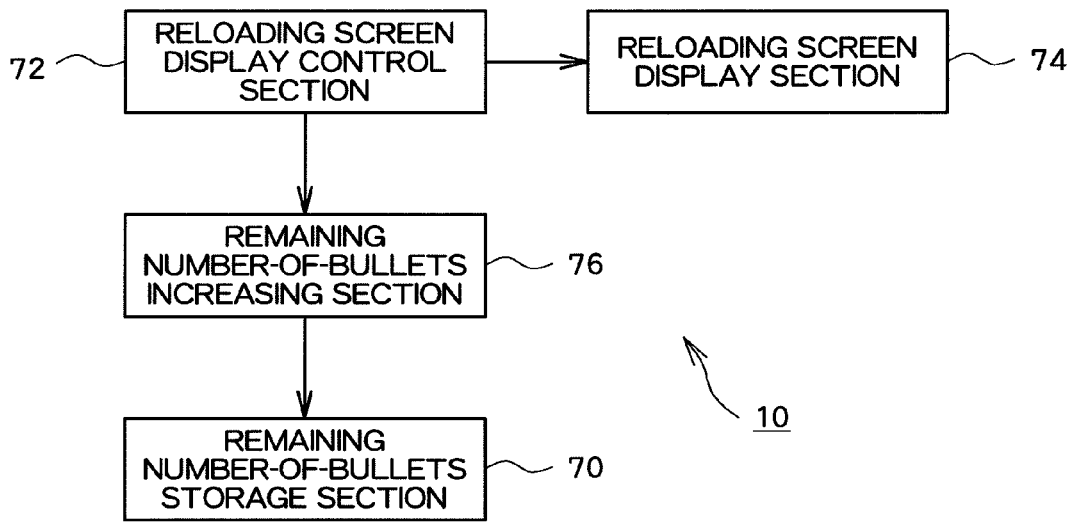
FIG. 10 is a functional block diagram of the mobile phone according to the embodiment.
FIG. 11 is a diagram illustrating an example of a loaded-state table.

Here, description is given of functional blocks implemented by the mobile phone 10. FIG. 10 mainly illustrates functional blocks related to a reloading function among the functional blocks implemented by the mobile phone 10. As illustrated in FIG. 10, the mobile phone 10 includes a remaining number-of-bullets storage section 70 (remaining number-of-times information storage means), a reloading screen display control section 72 (image moving means), a reloading screen display section 74 (display means), and a remaining number-of-bullets increasing section 76 (remaining number-of-times information update means).

[Remaining Number-of-Bullets Storage Section]

The remaining number-of-bullets storage section 70 is implemented by, for example, the storage section 26 (main memory). The remaining number-of-bullets storage section 70 stores remaining number-of-bullets information indicating the number of bullets remaining in the revolver-type pistol. In this embodiment, the remaining number-of-bullets storage section 70 stores a loaded-state table. FIG. 11 illustrates an example of the loaded-state table. As illustrated in FIG. 11, the loaded-state table includes a "chamber ID" field and a "loaded flag" field (attack enabled/disabled information). The chamber ID is information that uniquely identifies each of the chambers of the revolver-type pistol. The chamber ID "1" corresponds to the chamber region 54*a* (48*a*). In the same manner, the chamber ID "2", "3", "4", and "5" correspond to the chamber regions 54*b* (48*b*), 54*c* (48*c*), 54*d* (48*d*), and 54*e* (48*e*), respectively. The loaded flag indicates whether or not the chamber is loaded with a bullet. The loaded flag takes 0 or 1 as its value. The value "0" indicates a state in which the chamber is not loaded with a bullet, while the value "1" indicates a state in which the chamber is loaded with a bullet. Therefore, the number of the chambers for which the loaded flag is set to "1" indicates the remaining number of bullets.

[Reloading Screen Display Control Section and Reloading Screen Display Section]

The reloading screen display control section 72 is implemented mainly by, for example, the control section 24. The reloading screen display section 74 is implemented by the display section 12. The reloading screen display control section 72 displays the reloading screen 50, which includes the first cylinder 52 (first image) including the plurality of chamber regions 54 (reference regions), and the second cylinder 56 (second image), on the reloading screen display section 74. The reloading screen display control section 72 moves at least one of the first cylinder 52 and the second cylinder 56 based on contents of the player's operation, thereby changing a relative positional relationship between the first cylinder 52 and the second cylinder 56. In this embodiment, the reloading screen display control section 72 moves the second cylinder 56 according to a direction instructing operation of a user.

[Remaining Number-of-Bullets Increasing Section]

The remaining number-of-bullets increasing section 76 is implemented mainly by, for example, the control section 24. At a given timing, the remaining number-of-bullets increasing section 76 increases the remaining number of bullets stored in the remaining number-of-bullets storage section 70 based on the number of the chamber regions 54 included in the superposition region 58 in which the first cylinder 52 and the second cylinder 56 are superposed on each other. In this embodiment, the "given timing" is a time at which the player performs a predetermined operation (operation of depressing the reloading executing key). Note that the "given timing" may be, for example, a time at which a predetermined time period elapses after the reloading screen 50 has been displayed, or a time at which a predetermined time period elapses after the first cylinder 52 and the second cylinder 56 have been partially superposed on each other.

Figure 12:
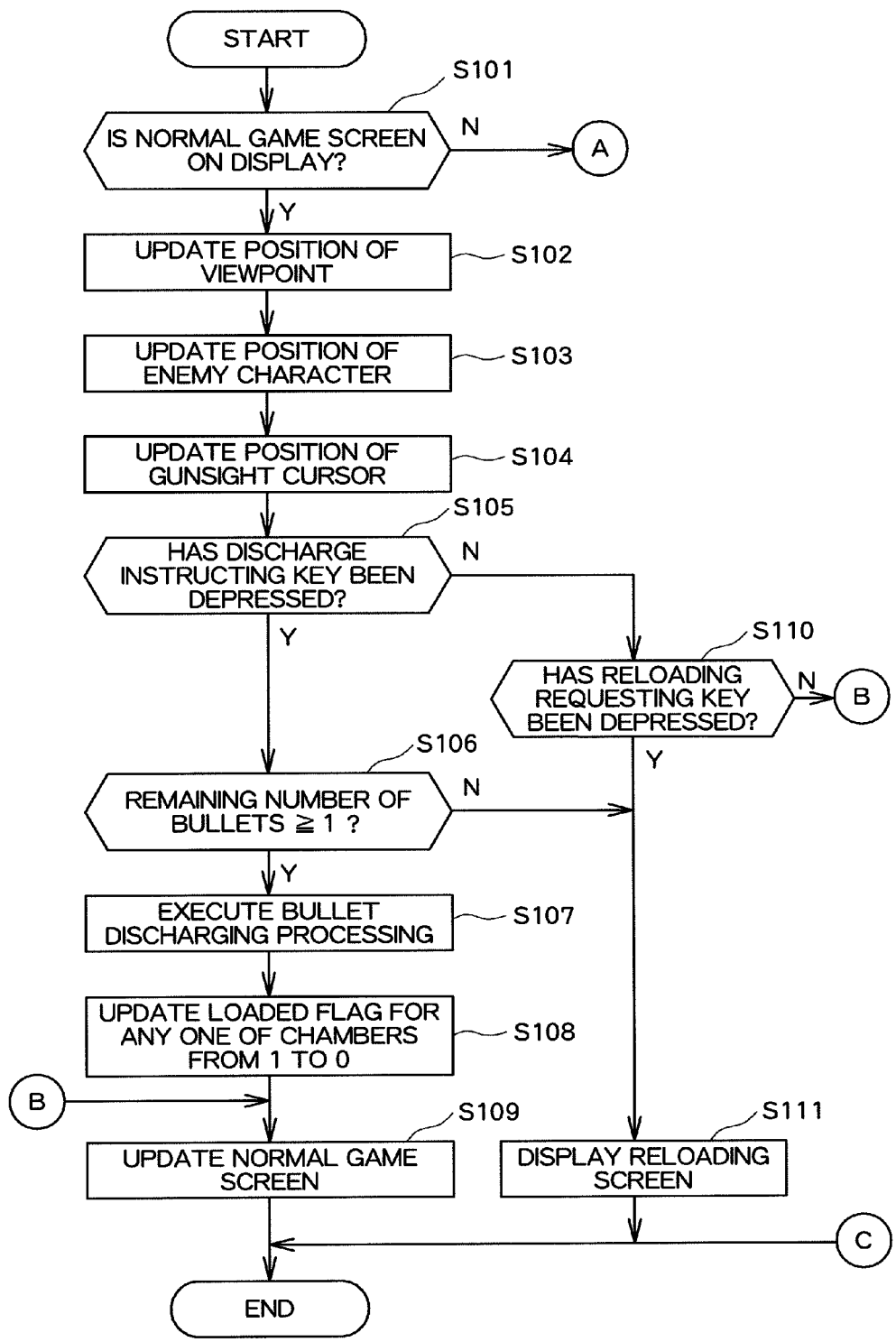
FIG. 12 is a flowchart illustrating processing executed by the mobile phone.
Figure 13:
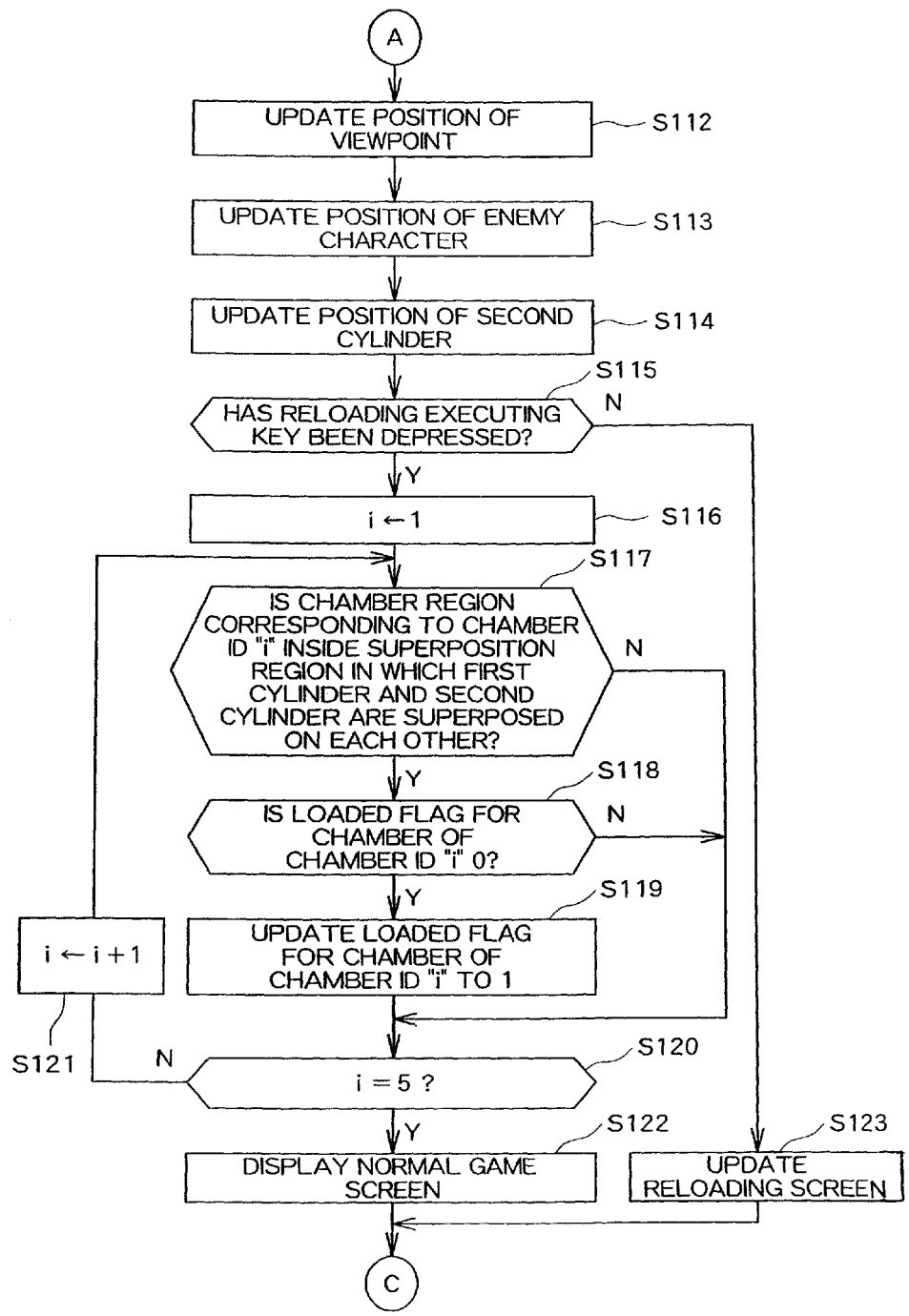
FIG. 13 is a flowchart illustrating the processing executed by the mobile phone.

Here, description is given of processing executed for implementing the above-mentioned functional blocks. FIGS. 12 and 13 are flowcharts illustrating the processing executed by the mobile phone 10 every predetermined cycle (for example, $\frac{1}{30}^{th}$ of a second). The control section 24 executes the processing illustrated in FIGS. 12 and 13 according to the program stored in the storage section 26.

As illustrated in FIG. 12, the control section 24 first judges whether or not the normal game screen 40 is on display (S101). If the normal game screen 40 is on display, the control section 24 executes a processing (S102 to S111) for a time of displaying the normal game screen 40. That is, the control section 24 updates the position of the viewpoint 66 (S102). For example, the control section 24 updates the position of the viewpoint 66 stored in the storage section 26 according to the contents of the operation of the direction indicating key 16*a*. Further, the control section 24 updates the position of the enemy character 42 (S103). For example, the control section 24 updates the position of the enemy character 42 stored in the storage section 26 to a position at which a movement has been made by a predetermined distance from the current position toward the viewpoint 66. Further, the control section 24 updates the position of the gunsight cursor 44 (S104). For example, the control section 24 judges the user's instructing direction based on an inclination of the mobile phone 10. Then, the control section 24 updates the position of the gunsight cursor 44 stored in the storage section 26 to the position at which movement has been made by a predetermined distance from the current position toward the direction instructed by the user.

After that, the control section 24 judges whether or not the discharge instructing key has been depressed (S105). If it is judged that the discharge instructing key has been depressed, the control section 24 judges whether or not the remaining number of bullets is equal to or larger than 1 (S106). For example, the control section 24 references the loaded-state table to judge whether or not the loaded flag for any one of the chambers is "1". If the loaded flag for any one of the chambers is "1", the control section 24 judges that the remaining number of bullets is equal to or larger than 1. If it is judged that the remaining number of bullets is equal to or larger than 1, the control section 24 executes a bullet discharging processing (S107). For example, the control section 24 judges a position of impact of the bullet based on the positions of the gunsight cursor 44 and the viewpoint 66, and judges whether or not the bullet has hit the enemy character 42 based on the position of impact. Then, if it is judged that the bullet has hit the enemy character 42, the control section 24 judges that the enemy character 42 has been exterminated, and removes the enemy character 42 from the virtual three-dimensional space 60.

After that, the control section 24 updates the loaded flag for any one of the chambers from "1" to "0" (S108). For example, the control section 24 updates the loaded flag for the chamber having the smallest number as the chamber ID to "0" among the chambers for which the loaded flag is "1". By execution of this processing, the remaining number of bullets of the pistol is decreased by 1. After that, the control section 24 updates the game screen 40 (S109). That is, the control section 24 sets the viewing direction to the direction Da, and generates the image indicating the state of the virtual three-dimensional space 60 when viewed from the viewpoint 66 in the viewing direction on a VRAM based on the position of each of the objects stored in the storage section 26. Further, the control section 24 acquires the remaining number-of-bullets informing image 46 based on the storage contents (loaded flag for each chamber) of the loaded-state table, and renders the remaining number-of-bullets informing image 46 so as to overwrite at a predetermined position of the image rendered in the VRAM. The image thus formed in the VRAM is displayed on the display section 12 as the game screen 40.

If it is judged in Step S106 that the remaining number of bullets is not equal to or larger than 1 (that is, if the discharge instructing key is depressed with the remaining number of bullets being 0), the control section 24 (reloading screen display control section 72) displays the reloading screen 50 (S111). That is, the control section 24 decides an initial position of the second cylinder 56 based on a random number, and updates the position of the second cylinder 56 stored in the storage section 26. Further, the control section 24 sets a color (black or white) for each of the chamber regions 54 of the first cylinder 52 based on the loaded-state table. After that, the control section 24 sets the viewing direction to the direction Db, and generates the image indicating the state of the virtual three-dimensional space 60 when viewed from the viewpoint 66 in the viewing direction in the VRAM based on the position of each of the objects stored in the storage section 26. The image thus generated in the VRAM is displayed on the display section 12 as the reloading screen 50.

If it is judged in Step S105 that the discharge instructing key has not been depressed, the control section 24 judges whether or not the reloading requesting key has been depressed (S110). If the reloading requesting key has been depressed, the control section (reloading screen display control section 72) displays the reloading screen 50 (S111). Meanwhile, if the reloading requesting key has not been depressed, the control section 24 updates the game screen 40 (S109).

If it is judged in Step S101 that the normal game screen 40 is not on display (that is, if the reloading screen 50 is on display), the control section 24 (reloading screen display control section 72 and remaining number-of-bullets increasing section 76) executes a processing (S112 to S123) for a time of displaying the reloading screen 50. That is, as illustrated in FIG. 13, the control section 24 updates the position of the viewpoint 66 (S112), and updates the position of the enemy character (S113). The processing of those steps is executed in the same manner as the processing of Steps S102 and S103. Further, the control section 24 updates the position of the second cylinder 56 based on the user's operation contents (S114). For example, the control section 24 judges the user's instructing direction based on the inclination of the mobile phone 10. Then, the control section 24 updates the position of the second cylinder 56 stored in the storage section 26 to the position at which movement has been made over a predetermined distance from the current position toward the direction instructed by the user.

After that, the control section 24 judges whether or not the reloading executing key has been depressed (S115). If the reloading executing key has been depressed, the control section 24 initializes a variable i to 1 (S116). Then, the control section 24 judges whether or not the chamber region 54 corresponding to the chamber ID "i" inside the first cylinder 52 is included in the superposition region 58 in which the first cylinder 52 and the second cylinder 56 are superposed on each other (S117). Note that the chamber region 54 may be judged to be included in the superposition region 58 if the entirety of the chamber region 54 is included in the superposition region 58, or the chamber region 54 may be judged to be included in the superposition region 58 if a part of the chamber region 54 is included in the superposition region 58.

If the chamber region 54 corresponding to the chamber ID "i" is included in the superposition region 58, the control section 24 judges whether or not the loaded flag for the chamber of the chamber ID "i" is "0" (S118). If the loaded flag for the chamber of the chamber ID "i" is "0", the control section 24 updates the loaded flag for the chamber of the chamber ID "i" to "1" (S119). After that, the control section 24 judges whether or not the value of the variable i is 5 (S120). Note that this processing is executed even if it is judged in Step S118 that the loaded flag for the chamber of the chamber ID "i" is not "0". In addition, this processing is executed even if it is judged in Step S117 that the chamber region 54 corresponding to the chamber ID "i" is not included in the superposition region 58.

If the value of the variable i is not 5, the control section 24 adds 1 to the value of the variable i (S121), and executes the processing of Steps S117 to S120 again. Meanwhile, if the value of the variable i is 5, the control section 24 determines that the reloading work has been completed to thereby display the normal game screen 40 (S122). Note that if it is judged in Step S115 that the reloading executing key has not been depressed, the control section 24 updates the reloading screen 50 (S123). For example, the control section 24 sets the color (black or white) of each of the chamber regions 54 of the first cylinder 52 based on the loaded-state table. After that, the control section 24 generates the image indicating the state of the virtual three-dimensional space 60 when viewed from the viewpoint 66 in the viewing direction (direction Db) in the VRAM based on the position of each of the objects stored in the storage section 26. The image thus generated on the VRAM is displayed on the display section 12 as the reloading screen 50.

On the mobile phone 10 described above, to perform reloading, the player must perform such a relatively burdensome operation as to superpose the second cylinder 56 on the first cylinder 52 on the reloading screen 50. According to the mobile phone 10, it becomes possible to cause the player to feel that the reloading work is burdensome, and as a result it becomes possible to improve the reality regarding the reloading. On the mobile phone 10, the normal game screen 40 and the reloading screen 50 are displayed based on the same virtual three-dimensional space 60, and while the reloading screen 50 is being displayed (the reloading work is being performed), the enemy character 42 keeps moving toward the player character (viewpoint 66) (see S113 of FIG. 13). Therefore, when the enemy character 42 approaches the player character (viewpoint 66) to some extent, the enemy character 42 is displayed on the reloading screen 50. According to the mobile phone 10, it becomes possible to cause the player to feel a sense of tension created when the reloading that is burdensome work must be performed with the approaching enemy kept in mind.

Further, on the mobile phone 10, the five chamber regions 54 are set in the first cylinder 52, and it is managed whether or not each of the chamber regions 54 is loaded with a bullet. In addition, to perform the reloading, the player needs to superpose the second cylinder 56 on the chamber region 54 that is not loaded with any bullet inside the first cylinder 52. For example, to perform the reloading of the revolver-type pistol, it is necessary to load each of the plurality of chambers inside the cylinder with a bullet, which makes the reloading work more burdensome. Therefore, in the case where the pistol is the revolver-type pistol, the sense of tension created when the reloading must be performed with the enemy kept in mind is further enhanced. In this respect, according to the mobile phone 10, it becomes possible to cause the player to feel that the reloading of the revolver-type pistol or the like is burdensome. In addition, it becomes possible to cause the player to feel a further enhanced sense of tension, as described above.

Note that the present invention is not limited to the above-mentioned embodiment.

For example, the gunsight cursor 44 may be moved based on the operation contents of, for example, the direction instructing key 16a. Further, the first cylinder 52 may be moved based on the operation contents of, for example, the direction instructing key 16a.

Further, for example, the size of the second cylinder 56 may be changed based on the remaining number of bullets. For example, data associating the remaining number of bullets with the size of the second cylinder 56 may be stored, and the size of the second cylinder 56 may be changed dynamically based on the remaining number of bullets. Further, for example, the second cylinders 56 (second cylinder objects), which are different in size from each other, may be stored in association with the remaining number of bullets, and the second cylinder 56 corresponding to the currently remaining number of bullets may be located in the virtual three-dimensional space 60. For example, the size of the second cylinder 56 may be changed between the case where the remaining number of bullets is 0 and the case where the remaining number of bullets is not 0. For example, the control section 24 may display the reloading screen 50 illustrated in FIG. 6 in the case where the remaining number of bullets is 0, and may display a reloading screen 50a illustrated in FIG. 14 in the case where the remaining number of bullets is not 0. On the reloading screen 50a illustrated in FIG. 14, the size of a second cylinder 56a is substantially the same as the size of one of the chamber regions 54 inside the first cylinder 52. On the reloading screen 50a illustrated in FIG. 14, it is monitored whether or not the chamber region 54 has been included in the superposition region 58 in which the first cylinder 52 and the second cylinder 56a are superposed on each other, and when it is judged that the chamber region 54 has been included in the superposition region 58, the loaded flag for the chamber related to the chamber region 54 is updated to "1", and the chamber is loaded with a bullet. Then, for example, when the player depresses a predetermined key (for example, input deciding key 16b), the reloading work is finished, and the normal game screen 40 is displayed. Accordingly, it becomes possible to change a difficulty of the reloading work according to the state in which the bullets remain. Note that the control section 24 may display the reloading screen 50 illustrated in FIG. 6 in the case where the remaining number of bullets is not 0, and may display the reloading screen 50a illustrated in FIG. 14 in the case where the remaining number of bullets is 0. Accordingly, it becomes possible to allow the player to make a selection between performing the reloading work that has relatively low difficulty at a relatively high frequency, and performing the reloading work having a relatively high difficulty at a relatively low frequency. Further, the size of the first cylinder 52 (chamber region 54) may be changed based on the remaining number of bullets. Accordingly, it also becomes possible to change the difficulty of the reloading work according to the state in which the bullets remain.

Figures 14, 15:
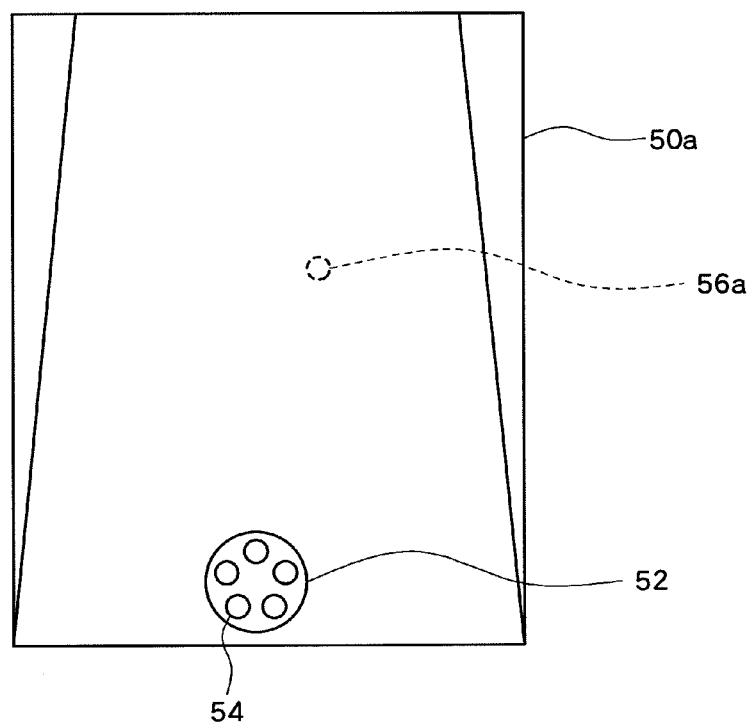
FIG. 14 is a diagram illustrating another example of the reloading screen.
FIG. 15 is a diagram illustrating an example of an increase number-of-bullets control table.

Further, for example, an increase number of the remaining number of bullets may be decided based on an area of the superposition region 58 in which the first cylinder 52 and the second cylinder 56 are superposed on each other. In this case, data (increase number information) associating the area of the superposition region 58 with the increase number of the remaining number of bullets is stored in the storage section 26 (increase number information storage means). FIG. 15 illustrates an example of the above-mentioned data (increase number-of-bullets control table). In this case, instead of the processing of Steps S116 to S120 of FIG. 13, such processing as described below is executed. That is, if it is judged in Step S115 that the reloading executing key has been depressed, the control section 24 acquires the area of the superposition region 58 in which the first cylinder 52 and the second cylinder 56 are superposed on each other at that point in time. After that, the control section (acquisition means and remaining number-of-times information update means) acquires the increase number of bullets corresponding to that area based on the above-mentioned data, and increases the remaining number of bullets based on that increase number of bullets. In this aspect, for example, in the case of setting the remaining number of bullets to 5 with the remaining number of bullets being 0, the player needs to adjust the position of the second cylinder 56 so that the first cylinder 52 and the second cylinder 56 are superposed on each other substantially completely. Further, for example, in the case of setting the remaining number of bullets to 5 with the remaining number of bullets being 4, the player only needs to adjust the position of the second cylinder 56 so that the first cylinder 52 and the second cylinder 56 are superposed on each other with a small overlap. For example, to perform the reloading of the revolver-type pistol, each of the plurality of chambers inside the cylinder needs to be loaded with a bullet, and hence how burdensome the reloading work is differs depending on the remaining number of bullets. In this respect, with the above-mentioned configuration, how burdensome the reloading work is changed depending on the remaining number of bullets, and as a result the reality is improved.

Further, for example, the difficulty of the reloading work may be changed based on a distance between the player character (viewpoint 66) and the enemy character 42.

For example, the position of the first cylinder 52 may be changed based on the distance between the player character (viewpoint 66) and the enemy character 42. For example, if the distance between the player character (viewpoint 66) and the enemy character 42 becomes equal to or smaller than a predetermined reference distance, the position of the first cylinder 52 may be changed based on a random number. That is, every predetermined cycle (for example, $\frac{1}{30}^{th}$ of a second), the first cylinder 52 may be moved by a predetermined distance in the direction decided based on the random number. In this case, as the distance between the player character (viewpoint 66) and the enemy character 42 becomes smaller, the distance by which the first cylinder 52 moves every predetermined cycle (for example, $\frac{1}{30}^{th}$ of a second) may become larger.

Alternatively, data associating the distance with the size of the second cylinder 56 may be stored, the size of the second cylinder 56 may be changed dynamically based on the distance between the player character (viewpoint 66) and the enemy character 42. Further, for example, the second cylinders 56 (second cylinder objects), which are different in size from each other, may be stored in association with the distance, the second cylinder 56 corresponding to the distance between the player character (viewpoint 66) and the enemy character 42 may be located in the virtual three-dimensional space 60. Alternatively, data associating the distance with the size of the first cylinder 52 (chamber region 54) may be stored, and the size of the first cylinder 52 (chamber region 54) may be changed dynamically based on the distance between the player character (viewpoint 66) and the enemy character 42. Further, for example, the first cylinders 52 (first cylinder objects), which are different from each other in size of the first cylinder 52 per se or of the chamber region 54, may be stored in association with the distance, and the first cylinder 52 corresponding to the distance between the player character (viewpoint 66) and the enemy character 42 may be located in the virtual three-dimensional space 60.

With the above-mentioned configuration, it becomes possible to cause the player to appreciate that the sense of tension created when the reloading work is performed under the situation in which the enemy is approaching is enhanced to a larger extent as the enemy comes closer.

Further, for example, the difficulty of the reloading work may be changed based on the number of enemy characters 42.

For example, the position of the first cylinder 52 may be changed based on the number of the enemy characters 42 positioned inside a predetermined region based on the position of the player character (viewpoint 66). For example, if the number of enemy characters 42 positioned in a region within a predetermined distance from the position of the player character (viewpoint 66) becomes equal to or larger than a predetermined reference number, the position of the first cylinder 52 may be changed based on a random number. That is, every predetermined cycle (for example, $\frac{1}{30}^{th}$ of a second), the first cylinder 52 may be moved by a predetermined distance in the direction decided based on the random number. In this case, as the number of enemy characters 42 becomes larger, the distance by which the first cylinder 52 moves every predetermined cycle (for example, $\frac{1}{30}^{th}$ of a second) may become larger.

Alternatively, data associating the number of the enemy characters 42 with the size of the second cylinder 56 may be stored, and the size of the second cylinder 56 may be changed dynamically based on the number of enemy characters 42 positioned inside the predetermined region based on the position of the player character (viewpoint 66). Further, for example, the second cylinders 56 (second cylinder objects), which are different in size from each other, may be stored in association with the number of enemy characters 42, and the second cylinder 56 corresponding to the number of enemy characters 42 positioned inside the predetermined region based on the position of the player character (viewpoint 66) may be located in the virtual three-dimensional space 60. Alternatively, data associating the number of the enemy characters 42 with the size of the first cylinder 52 (chamber region 54) may be stored, the size of the first cylinder 52 (chamber region 54) may be changed based on the number of the enemy characters 42 positioned inside the predetermined region based on the position of the player character (viewpoint 66). Further, for example, the first cylinders 52 (first cylinder objects), which are different from each other in size of the first cylinder 52 per se or of the chamber region 54, may be stored in association with the number of the enemy characters 42, the first cylinder 52 corresponding to the number of the enemy characters 42 positioned inside the predetermined region based on the position of the player character (viewpoint 66) may be located in the virtual three-dimensional space 60.

With the above-mentioned configuration, it becomes possible to cause the player to appreciate that the sense of tension created when the reloading work is performed under the situation in which the enemy is approaching is enhanced to a larger extent as the number of enemies becomes larger.

Further, for example, the difficulty of the reloading work may be changed based on a condition (stamina, level of tiredness, or the like) of the player character.

For example, the position of the first cylinder 52 may be changed based on a condition parameter indicating the condition of the player character. The condition parameter is, for example, a stamina parameter that varies with an attack from the enemy character 42 (a contact with the enemy character 42) or a tiredness parameter that varies with an action (movement, attacking, or the like) performed by the player character. For example, if a value of the condition parameter of the player character becomes equal to or larger than a predetermined reference value, or if the value of the condition parameter of the player character becomes equal to or smaller than the predetermined reference value, the position of the first cylinder 52 may be changed based on a random number. That is, every predetermined cycle (for example, $\frac{1}{30}^{th}$ of a second), the first cylinder 52 may be moved by a predetermined distance in the direction decided based on the random number. In this case, as the value of the condition parameter of the player character becomes larger or becomes smaller, the distance by which the first cylinder 52 moves every predetermined cycle (for example, $\frac{1}{30}^{th}$ of a second) may become larger.

Alternatively, data associating a parameter value with the size of the second cylinder 56 may be stored, the size of the second cylinder 56 may be changed dynamically based on the value of the condition parameter of the player character. Further, for example, the second cylinders 56 (second cylinder objects), which are different in size from each other, may be stored in association with the parameter value, and the second cylinder 56 corresponding to the value of the condition parameter of the player character may be located in the virtual three-dimensional space 60. Alternatively, data associating the parameter value with the size of the first cylinder 52 (chamber region 54) may be stored, and the size of the first cylinder 52 (chamber region 54) may be changed dynamically based on the value of the condition parameter of the player character. Further, for example, the first cylinders 52 (first cylinder objects), which are different from each other in size of the first cylinder 52 per se or of the chamber region 54 may be stored in association with the parameter value, and the first cylinder 52 corresponding to the value of the condition parameter of the player character may be located in the virtual three-dimensional space 60.

With the above-mentioned configuration, it becomes possible to cause the player to appreciate that the reloading work becomes more difficult as the stamina of the player character becomes lower or that the reloading work becomes more difficult as the tiredness of the player character becomes higher.

Further, for example, the difficulty of the reloading work may be changed based on a degree of progress of the game.

For example, the position of the first cylinder 52 may be changed based on the degree of progress of the game. The degree of progress of the game is, for example, the number of enemy characters that have been exterminated by the player (player character), a total cumulative distance by which the player character has moved, or the like. Further, for example, in the case of the game which includes a plurality of stages, the degree of progress of the game is the number of stages that have been cleared by the player. For example, if the degree of progress of the game becomes a predetermined reference degree of progress, the position of the first cylinder 52 may be changed based on a random number. That is, every predetermined cycle (for example, $1/30^{th}$ of a second), the first cylinder 52 may be moved by a predetermined distance in the direction decided based on the random number. In this case, as the game progresses, the distance by which the first cylinder 52 moves every predetermined cycle (for example, $1/30^{th}$ of a second) may become larger.

Alternatively, data associating the degree of progress of the game with the size of the second cylinder 56 may be stored, the size of the second cylinder 56 may be changed dynamically based on the degree of progress of the game. Further, for example, the second cylinders 56 (second cylinder objects), which are different from each other in size, may be stored in association with the degree of progress of the game, and the second cylinder 56 corresponding to the current degree of progress of the game may be located in the virtual three-dimensional space 60. Alternatively, data associating the degree of progress of the game with the size of the first cylinder 52 (chamber region 54) may be stored, and the size of the first cylinder 52 (chamber region 54) may be changed dynamically based on the degree of progress of the game. Further, for example, the first cylinders 52 (first cylinder objects), which are different from each other in size of the first cylinder 52 per se or of the chamber region 54, may be stored in association with the degree of progress of the game, and the first cylinder 52 corresponding to the current degree of progress of the game may be located in the virtual three-dimensional space 60.

With the above-mentioned configuration, it becomes possible to cause the player to appreciate that, as the game progresses, for example, the player character becomes more fatigued and the reloading work becomes more difficult.

Further, for example, the position of the first cylinder 52 may be changed based on the remaining number of bullets. For example, if the remaining number of bullets is equal to or larger than a predetermined reference value, or if the remaining number of bullets is equal to or smaller than the predetermined reference value, the position of the first cylinder 52 may be changed based on a random number. That is, every predetermined cycle (for example, $1/30^{th}$ of a second), the first cylinder 52 may be moved by a predetermined distance in the direction decided based on the random number. In this case, as the remaining number of bullets becomes larger or becomes smaller, the distance by which the first cylinder 52 moves every predetermined cycle (for example, $1/30^{th}$ of a second) may become larger. With the above-mentioned configuration, the difficulty of the reloading work may be changed based on the remaining number of bullets.

Further, for example, by moving the first cylinder 52 according to the direction instructing operation of the player, the relative positional relationship between the first cylinder 52 and the second cylinder 56 may be changed according to the contents of the player's operation. In this case, in the same manner as the aspect described above, the position of the second cylinder 56 may be changed based on the distance between the player character (viewpoint 66) and the enemy character 42, the number of the enemy characters 42, the value of the condition parameter of the player character, the degree of progress of the game, or the remaining number of bullets. Further, for example, by moving both the first cylinder 52 and the second cylinder 56 according to the direction instructing operation of the player, the relative positional relationship between the first cylinder 52 and the second cylinder 56 may be changed according to the contents of the player's operation.

Further, for example, the game executed on the mobile phone 10 is not limited to a game in which a three-dimensional game space formed of three coordinate elements is displayed on a screen. The game executed on the mobile phone 10 may be a game in which a two-dimensional game space formed of two coordinate elements is displayed on a screen.

Further, for example, the present invention can be applied to a game other than the gun shooting game. The present invention can be applied to such a game that the attack target is attacked under a limitation that "the remaining number of times the attack target can be attacked is managed, and in a case where the remaining number of times becomes 0 or other similar case, the remaining number of times needs to be increased". For example, the present invention can be applied to such a game that the attack target is attacked with the use of "such a weapon that the remaining number of times the attack target can be attacked is set, and in the case where the remaining number of times becomes 0 or other similar case, the remaining number of times needs to be recovered". According to the present invention, it becomes possible to improve the reality regarding the burdensomeness felt when the above-mentioned remaining number of times is increased. Note that the "attack target" is not limited to the enemy character, and may be, for example, a target object such as a simple target.

The invention claimed is:

1. A game device for executing a game in which an attack on one or more attack targets is performed, the game device comprising:
   a remaining number-of-times information storage that stores remaining number-of-times information that indicates a remaining number of times an attack on one or more attack targets can be performed;
   a display section that displays a screen that comprises:
   a first image containing a plurality of reference regions; and a second image that is not a cursor; and a control section that moves at least one of the first image and the second image according to a direction instructing operation of a player, and increases the remaining number of times based on a number of said plurality of reference regions included in a superposition region formed by an area in which the first image and the second image overlap each other.

2. A game device according to claim 1, wherein:

the remaining number-of-times information storage stores attack enabled/disabled information, which indicates whether the attack on one or more attack targets can be performed, in association with each of the plurality of reference regions;

the control section further updates, in a case where the attack on one or more attack targets is performed, the attack enabled/disabled information associated with any one of the plurality of reference regions associated with the attack enabled/disabled information indicating that the attack on one or more attack targets can be performed, so as to indicate that the attack on one or more attack targets cannot be performed; and in a case where the attack enabled/disabled information, which is associated with a reference region included in the superposition region in which the first image and the second image are superposed on each other, indicates that the attack on one or more attack targets cannot be performed, updates the attack enabled/disabled information so as to indicate that the attack on one or more attack targets can be performed.

3. A game device according to claim 1, wherein:

the control section moves the second image according to the direction instructing operation of the player, and changes a size of the second image based on the remaining number of times.

4. A game device according to claim 1, wherein the control section moves one of the first image and the second image according to the direction instructing operation of the player, and changes a position of the other of the first image and the second image based on a distance between an attack target and one of a player character and a viewpoint.

5. A game device according to claim 1, wherein the control section moves one of the first image and the second image according to the direction instructing operation of the player, and changes a position of the other of the first image and the second image based on a number of one or more attack targets positioned inside a predetermined region based on a position of a player character or a viewpoint.

6. A game device according to claim 1, wherein the control section moves one of the first image and the second image according to the direction instructing operation of the player, and changes a position of the other of the first image and the second image based on a value of a condition parameter that indicates a condition of a player character.

7. A game device according to claim 1, wherein the control section moves one of the first image and the second image according to the direction instructing operation of the player, and changes a position of the other of the first image and the second image based on a degree of progress of the game.

8. A control method for a game device that includes at least one processor for executing a game in which an attack on one or more attack targets is performed, the control method comprising:

reading from a remaining number-of-times information storage remaining number-of-times information that indicates a remaining number of times an attack on one or more attack targets can be performed;

displaying, on a display, a screen that comprises:
a first image containing a plurality of reference regions; and
a second image that is not a cursor;

moving at least one of the first image and the second image according to a direction instructing operation of a player; and increasing, using the at least one processor, the remaining number of times based on a number of said plurality of reference regions included in a superposition region formed by an area in which the first image and the second image overlap each other.

9. A program stored in a non-transitory computer readable medium for causing a computer to function as a game device for executing a game in which an attack on one or more attack targets is performed, the program further causing the computer to function as:

a remaining number-of-times information storage that stores remaining number-of-times information that indicates a remaining number of times an attack on one or more attack targets can be performed;

a display section that displays a screen that comprises:
a first image containing a plurality of reference regions; and
a second image that is not a cursor; and a control section that moves at least one of the first image and the second image according to a direction instructing operation of a player, and increases the remaining number of times based on a number of said plurality of reference regions included in a superposition region formed by an area in which the first image and the second image overlap each other.

10. A non-transitory computer-readable information storage medium storing a program, the program causing a computer to function as a game device for executing a game in which an attack on one or more attack targets is performed, the program further causing the computer to function as:

a remaining number-of-times information storage that stores remaining number-of-times information that indicates a remaining number of times an attack on one or more attack targets can be performed;

a display section that displays a screen that comprises:
a first image containing a plurality of reference regions; and
a second image that is not a cursor; and a control section that moves at least one of the first image and the second image according to a direction instructing operation of a player, and increases the remaining number of times based on a number of said plurality of reference regions included in a superposition region formed by an area in which the first image and the second image overlap each other.

11. A game device for executing a game in which an attack on one or more attack targets is performed, the game device comprising:

a remaining number-of-times information storage that stores remaining number-of-times information that indicates a remaining number of times an attack on one or more attack targets can be performed;

a display section that displays a game screen that comprises:
a first image containing a plurality of reference regions; and
a second image that is not a cursor;

a control section that moves at least one of the first image and the second image according to a direction instructing operation of a player, stores increase number information that associates an area of a superposition region with an increase number of the remaining number of times,
acquires the increase number corresponding to the area of a superposition region formed by an area in which the first image and the second image overlap each other based on the increase number information, and
increases the remaining number of times based on the acquired increase number.

12. A control method for a game device including at least one processor for executing a game in which an attack on one or more attack targets is performed, the control method comprising:
reading from a remaining number-of-times information storage remaining number-of-times information that indicates a remaining number of times an attack on one or more attack targets can be performed;
displaying, on a display, a game screen that comprises:
a first image containing a plurality of reference regions; and
a second image that is not a cursor;
moving at least one of the first image and the second image according to a direction instructing operation of a player;
reading, using the at least one processor, from an increase number information storage increase number information that associates an area of a superposition region with an increase number of the remaining number of times;
acquiring, using the at least one processor, the increase number corresponding to the area of a superposition region formed by an area in which the first image and the second image overlap each other based on the increase number information; and
increasing, using the at least one processor, the remaining number of times based on the acquired increase number.

13. A program stored in a non-transitory computer readable medium for causing a computer to function as a game device for executing a game in which an attack on one or more attack targets is performed,
the program further causing the computer to function as:
a remaining number-of-times information storage that stores remaining number-of-times information that indicates a remaining number of times an attack on one or more attack targets can be performed;
a display section that displays a game screen that comprises:
a first image containing a plurality of reference regions; and
a second image that is not a cursor; and
a control section that moves at least one of the first image and the second image according to a direction instructing operation of a player,
reads increase number information that associates an area of a superposition region with an increase number of the remaining number of times,
acquires the increase number corresponding to the area of a superposition region formed by an area in which the first image and the second image overlap each other based on the increase number information, and
increases the remaining number of times based on the acquired increase number.

14. A non-transitory computer-readable information storage medium storing a program, the program causing a computer to function as a game device for executing a game in which an attack on one or more attack targets is performed,
the program further causing the computer to function as:
a remaining number-of-times information storage that stores remaining number-of-times information that indicates a remaining number of times an attack on one or more attack targets can be performed;
a display section that displays a game screen that comprises:
a first image containing a plurality of reference regions; and
a second image that is not a cursor; and
a control section that moves at least one of the first image and the second image according to a direction instructing operation of a player,
reads increase number information that associates an area of a superposition region with an increase number of the remaining number of times,
acquires the increase number corresponding to the area of a superposition region formed by an area in which the first image and the second image overlap each other based on the increase number information, and
increases the remaining number of times based on the acquired increase number.

15. A game device for executing a game in which an attack on one or more attack targets is performed, the game device comprising:
a storage that stores ammunition information that indicates a remaining amount of ammunition that can be used to perform an attack in a game screen; and
a controller that, in response to an operation of a player of the game device, displays a reload screen comprising:
a first image containing a plurality of ammunition regions; and
a second image that corresponds in a shape to the first image,
wherein the controller moves at least one of the first image and the second image according to a direction instructing operation of the player, and increases the remaining amount of ammunition according to a number of the plurality of ammunition regions of the first image that are overlapped by the second image.

16. The game device according to claim 15, wherein a portion of the ammunition regions are empty and another portion of the ammunition regions are not-empty, and
the controller increases the remaining amount of ammunition according to a number of the plurality of ammunition regions of the first image that are both empty and overlapped by the second image.

17. The game device according to claim 15, wherein the reload screen is different than the game screen.

18. The game device according to claim 15, wherein the reload screen is a portion of the game screen.

19. The game device according to claim 15, wherein a viewing direction of the game screen is a first viewing direction, and the reload screen is the game screen in which the viewing direction is set to a second viewing direction different than the first viewing direction.

20. A control method for a game device including at least one processor for executing a game in which an attack on one or more attack targets is performed, the control method comprising:
storing ammunition information that indicates a remaining amount of ammunition that can be used to perform an attack in a game screen; and
in response to an operation of a player of the game device, displaying a reload screen comprising:
a first image containing a plurality of ammunition regions; and a second image that corresponds in a shape to the first image, moving, using the at least one processor, at least one of the first image and the second image according to a direction instructing operation of the player; and increasing, using the at least one processor, the remaining amount of ammunition according to a number of the plurality of ammunition regions of the first image that are overlapped by the second image.

21. A non-transitory computer-readable information storage medium storing a program, the program causing a computer to function as a game device for executing a game in which an attack on one or more attack targets is performed, the program further causing the computer to function as:

a storage that stores ammunition information that indicates a remaining amount of ammunition that can be used to perform an attack in a game screen; and a controller that, in response to an operation of a player of the game device, displays a reload screen comprising:

a first image containing a plurality of ammunition regions; and a second image that corresponds in a shape to the first image, wherein the controller moves at least one of the first image and the second image according to a direction instructing operation of the player, and increases the remaining amount of ammunition according to a number of the plurality of ammunition regions of the first image that are overlapped by the second image.

* * * * *